United States Patent
Hsu et al.

(10) Patent No.: US 7,253,977 B2
(45) Date of Patent: Aug. 7, 2007

(54) MONOLITHIC COLOR WHEEL AND PROCESS FOR FABRICATION OF THE SAME

(75) Inventors: Pi-Tsung Hsu, Hsinchu (TW); Chih-Wei Tso, Hsinchu (TW)

(73) Assignee: Premier Image Technology Corporation, Taipei (TW)

( * ) Notice: Subject to any disclaimer, the term of this patent is extended or adjusted under 35 U.S.C. 154(b) by 0 days.

(21) Appl. No.: 11/392,834

(22) Filed: Mar. 30, 2006

(65) Prior Publication Data
US 2006/0227441 A1    Oct. 12, 2006

(30) Foreign Application Priority Data
Apr. 7, 2005    (TW) .................. 94111040 A

(51) Int. Cl.
*G02B 5/22*    (2006.01)
(52) U.S. Cl. ............ 359/891; 359/885; 359/889; 348/743; 356/418; 353/84
(58) Field of Classification Search ........... 359/891, 359/892, 885, 889; 348/743; 356/418; 353/84; 362/293
See application file for complete search history.

(56) References Cited

U.S. PATENT DOCUMENTS

| 5,371,543 A * | 12/1994 | Anderson | 348/270 |
| 6,334,924 B1 * | 1/2002 | Fukushima | 156/264 |
| 2005/0030659 A1 * | 2/2005 | Asakawa | 359/892 |

* cited by examiner

*Primary Examiner*—Leonidas Boutsikaris
(74) *Attorney, Agent, or Firm*—Birch, Stewart, Kolasch & Birch, LLP

(57) ABSTRACT

A method for fabricating a monolithic color wheel. The method includes (a) preparing a square transparent substrate; (b) forming a plurality of color filters on the square transparent substrate; and (c) cutting the square transparent substrate and the color filters together along a circular path, to form a color filter disk. Through these steps, a color filter disk of color wheel can be produced with better dynamic equilibrium quality, and will run more quietly and smoothly.

14 Claims, 4 Drawing Sheets

MONOLITHIC COLOR WHEEL AND PROCESS FOR FABRICATION OF THE SAME

FIELD OF THE INVENTION

The present invention relates to a method for fabricating a monolithic color wheel and more particularly, to a method which includes the steps of adding some color filtering thin films on a single substrate, and then cutting it to form a round filter disk.

BACKGROUND OF THE INVENTION

At present, there are two methods for fabricating a filter disk for a color wheel. The first method includes a step of bonding a set of fan-shaped substrates which is coated with color filtering thin films to form a filter disk. The second method includes a step of patching a set of fan-shaped colors onto a round substrate, so as to fabricate a filter disk of color wheel.

For instance, in U.S. Pat. No. 5,868,482, a color wheel includes a plurality of fan-shaped substrates which are coated with color filtering thin films respectively, and are connected to a metal ring which is connected to a motor.

In U.S. Pat. No. 5,371,543, the color wheel includes a set of fan-shaped filtering thin films which are coated on a preformed round substrate to obtain a filter disk. The filter disk is driven by a motor to rotate at high speed.

The cutting process according to the prior art for preparation of the fan-shaped substrate and thin filtering films always suffers from unavoidable deviation and deficiencies that reduce the quality of the color filter. Furthermore, the deviation and deficiencies affect the appearance of the filter disk of the color wheel while the fan-shaped elements are glued together to form a filter disk, and thus also causing loss of dynamic balance, and induce a wind cutting noise when rotating at high speed and lower the service life of the color wheel.

SUMMARY OF THE INVENTION

In order to solve the drawbacks of the prior art as stated above, an object of the present invention is to provide a method for fabricating a monolithic color wheel.

Accordingly, the method of this invention includes the steps of cutting a single monolithic substrate which is preformed, to have a plurality of color filtering thin films thereon to produce a filter disk. Therefore, the deviation and deficiencies as stated above which occurred in preparing the fan-shaped substrate shall be eliminated, and the planeness, true roundness and concentricity of the filter disk shall be improved.

In other words, according to the present invention, because all of the needed color filtering thin films are preformed on a single monolithic substrate before cutting them all into a filter disk, the dynamic balance quality can be improved and the noise of wind cutting is avoided.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Figure 1:
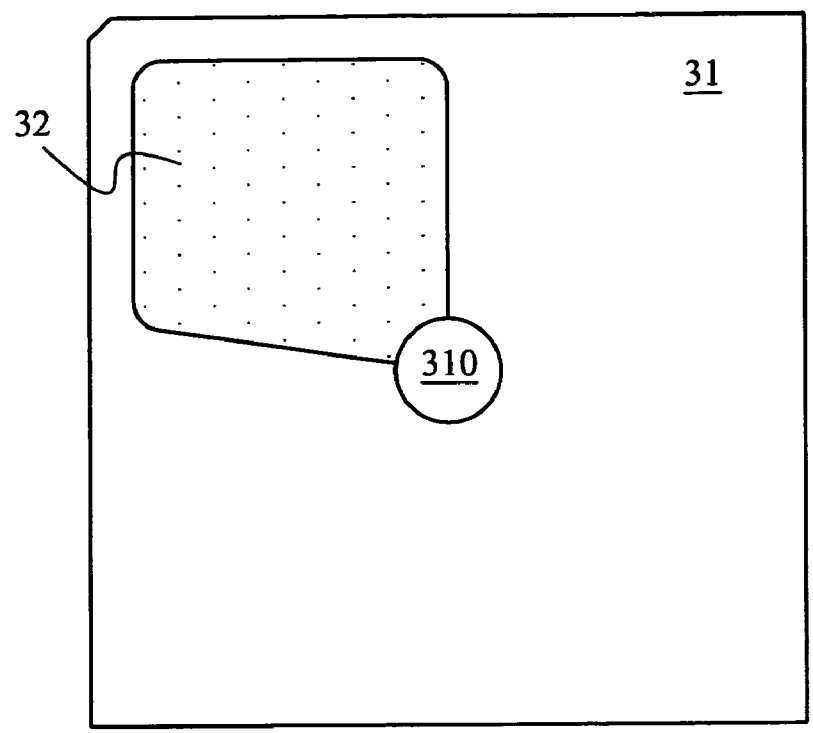
FIG. 1 is a schematic view showing a first color filtering film preformed onto the single substrate.
Figure 2:
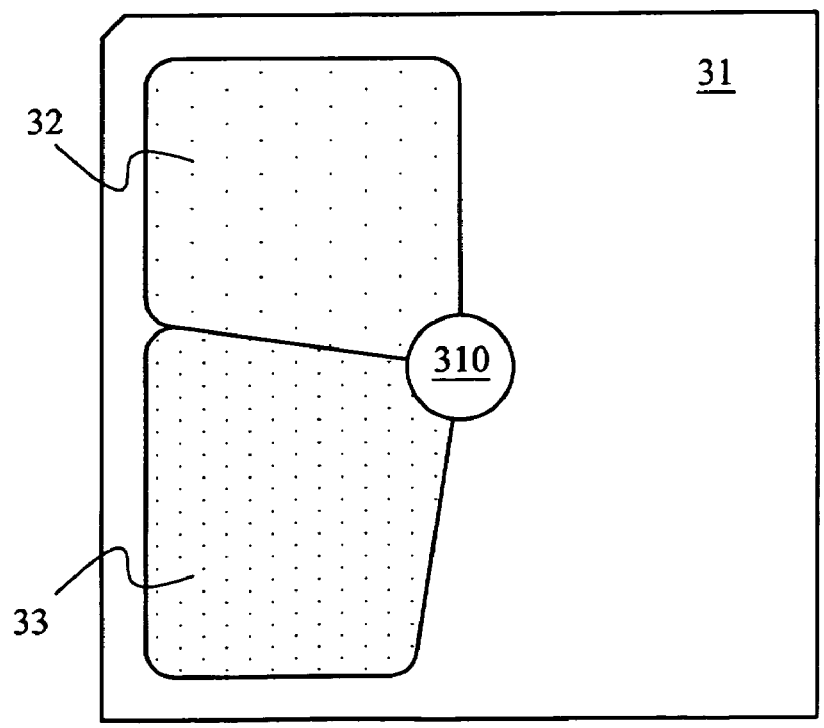
FIG. 2 is a schematic view showing a second color filtering film preformed onto the single substrate.
Figure 3:
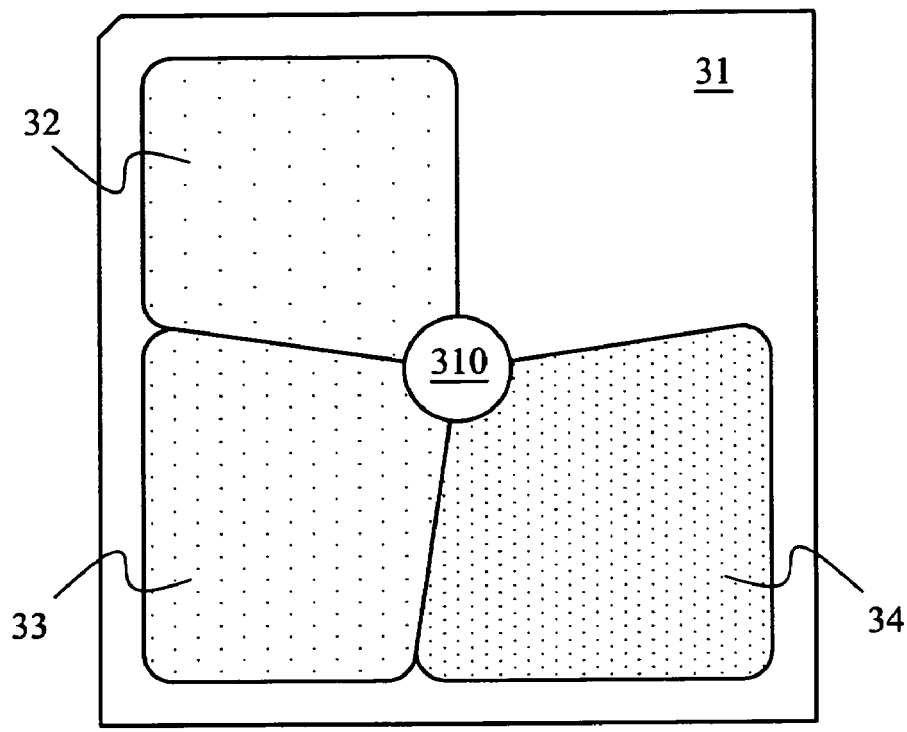
FIG. 3 is a schematic view showing a third color filtering film preformed onto the single substrate.
Figure 4:
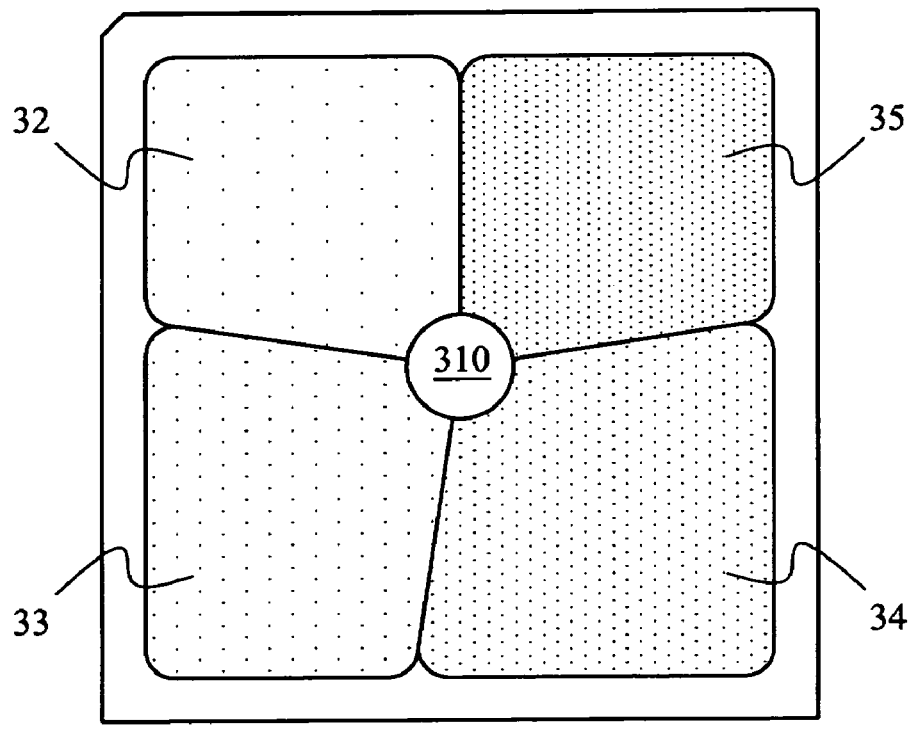
FIG. 4 is a schematic view showing a fourth color filtering film preformed onto the single substrate.

The method for fabrication of a monolithic color wheel in accordance with the present invention, generally comprises the steps of preparing a square transparent substrate; forming a plurality of color filtering thin films on the square transparent substrate; cutting the square transparent substrate and the color thin filtering films along a predetermined circular path to form a color filter disk; and connecting the filter disk to a motor shaft. Alternatively, the filter disk can also be connected to a metal ring which is connected to a motor shaft. Therefore, the filter disk can be driven by the motor to rotate at high speed.

Referring to FIGS. 1 to 4 which show the first step of the method in accordance with the present invention, a square transparent substrate (31) is preformed by deposition to form a first color filtering thin film (32), a second color filtering thin film (33), a third color filtering thin film (34) and a fourth color filtering thin film (35) thereon. Preferably, the square transparent substrate (31) is made from glass, plastic, or quartz materials. The color filtering thin films (32), (33), (34), (35) are one of red, green, or blue filtering thin film respectively. Preferably, to the center of the square transparent substrate (31) may be added a round mark, badge or pattern (310) to form a center point of the cutting process and to improve the appearance of the product.

Alternatively, the color filtering thin films (32), (33), (34), (35) can also be preformed on some different fan-shaped thin substrates separately, and then the fan-shaped thin substrate patched onto a square transparent substrate (31) by an optically transparent adhesive. Preferably, the optically transparent adhesive can be an optically transparent adhesive which is suitable for working in a high temperature environment. For instance, the optical transparent adhesive can be the Norland Company's NOA-61 optically transparent adhesive which is usable in patching the color filtering thin films (32), (33), (34), (35) onto the square transparent substrate (31). Through this alternative step, the costs of the mask device and masking process which are all necessary in the deposition process for forming the different color filtering thin films (32), (33), (34), (35) onto the square transparent substrate (31) are avoided.

Figure 5:
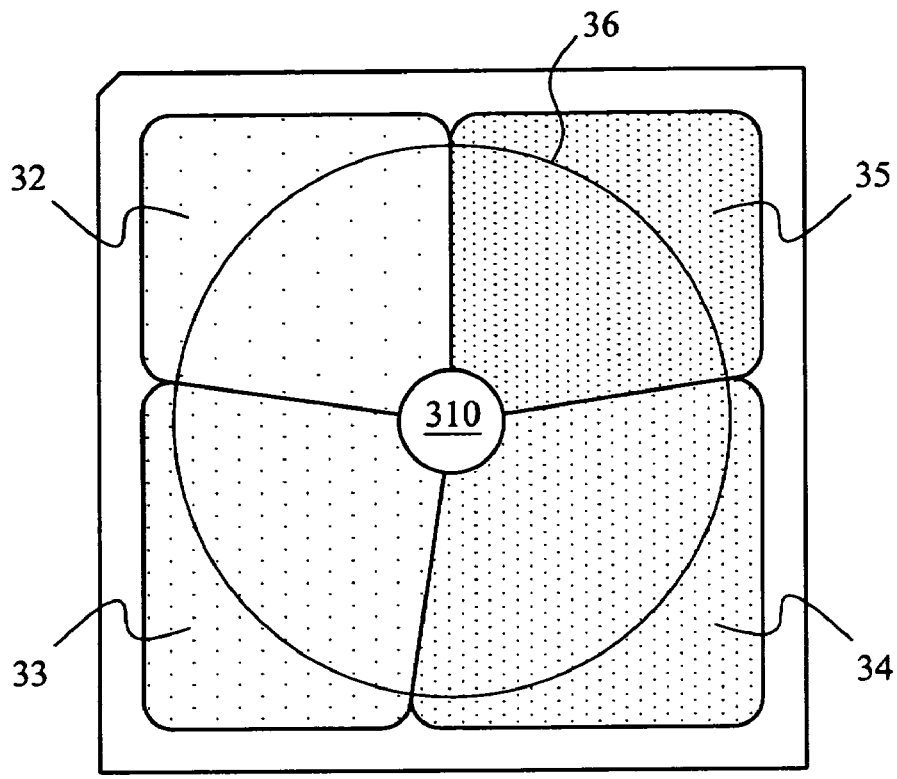
FIG. 5 is a schematic view illustrating a circular path which is predetermined in the embodiment of FIG. 4.
Figure 6:
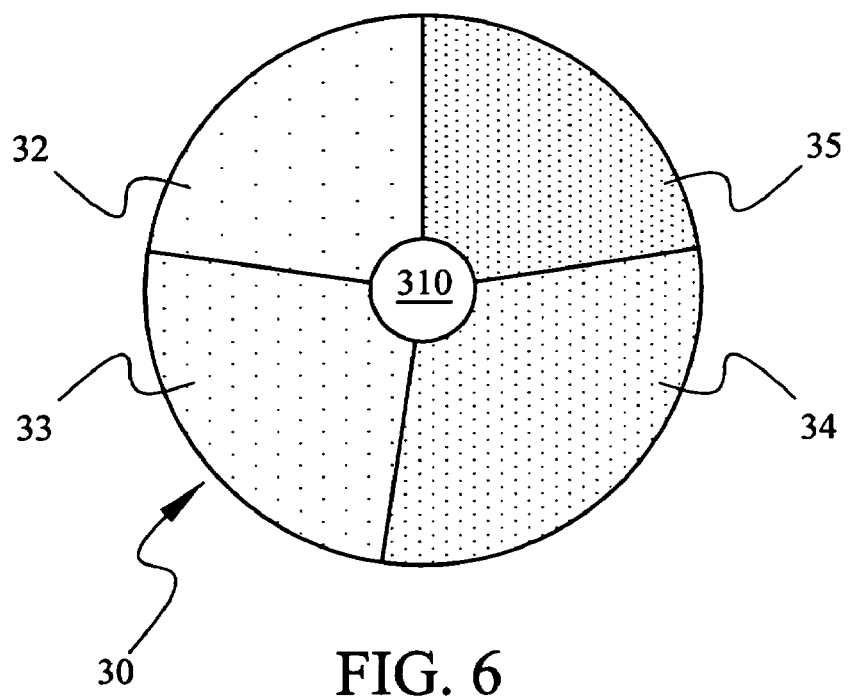
FIG. 6 is a schematic view illustrating a filter disk which can be obtained by cutting the color filtering thin films and the single substrate along the predetermined circular path of FIG. 5.

FIGS. 5-6, illustrate the second step of the method in accordance with the present invention. In this step, the square substrate (31) and the color filtering thin films (32), (33), (34), (35) are to be cut together along a round path (36) to form a filter disk (30).

Figure 7:
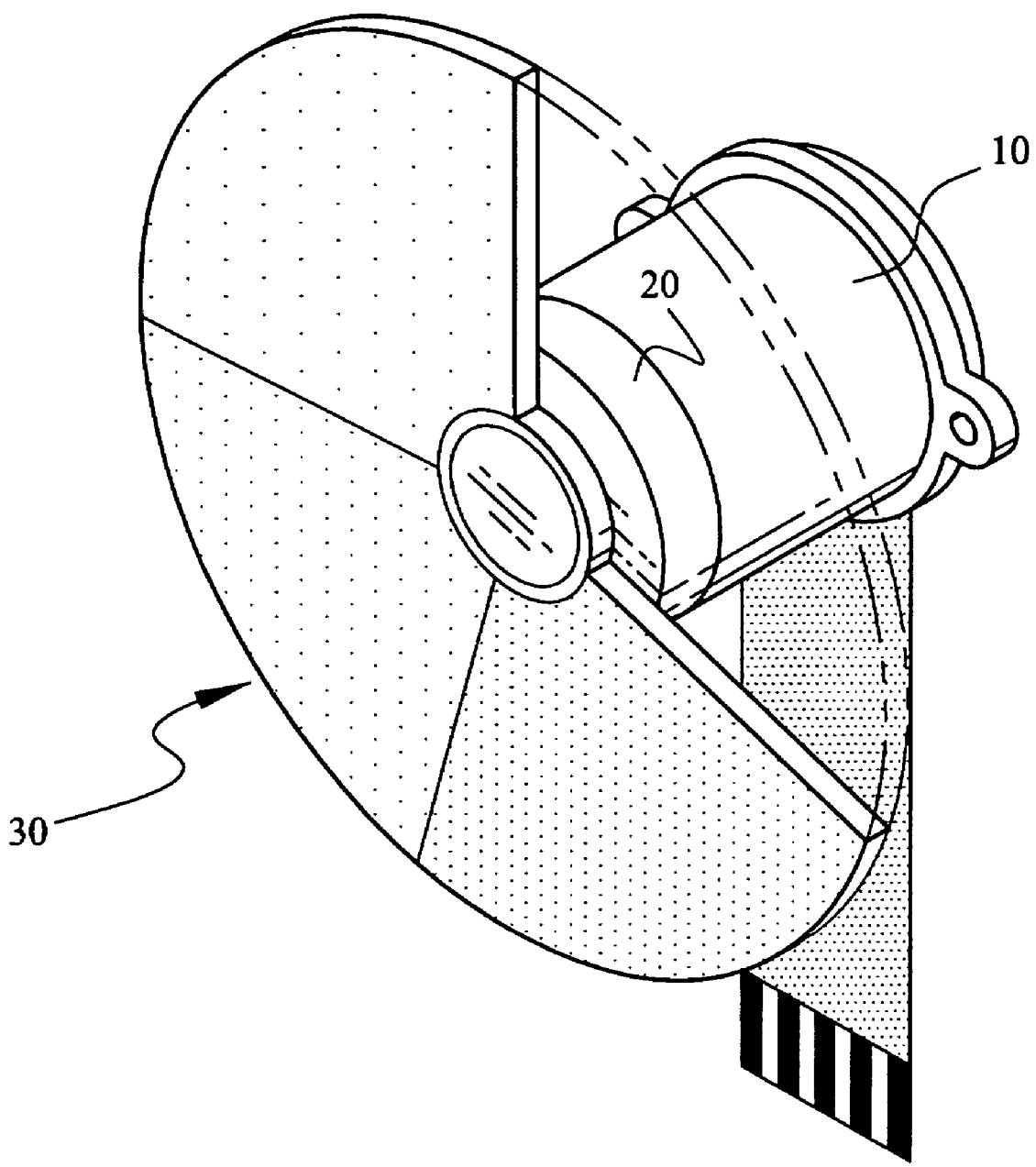
FIG. 7 is a perspective view showing the embodiment of the filter disk of the color wheel in accordance with the present invention.

FIG. 7 illustrates the third step of the method in accordance with the present invention. On this step, the filter disk (30) is connected to a metal ring (20) which is connected to a motor (10), and therefore is driven by the motor (10) indirectly. Alternatively, the filter disk (30) can also be connected to a rotatable motor shell which can carry the filter disk (30) to rotate at high speed (not shown).

The color filtering thin films (32), (33), (34), (35) are predeposited on the square transparent substrate (31) and are radially extended from the center to form a fan-shaped thin films, either in symmetric or asymmetric configurations, and then are cut into a circular filter disk along a predetermined path. Through the steps of the present invention, the dynamic balance of the filter disk of color wheel would be improved, and the noise of wind cutting at high speed rotation can be lowered.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for fabricating a monolithic color wheel, comprising the steps of:
   preparing a monolithic transparent substrate,
   adding a plurality of color filtering thin films on the transparent substrate; and
   cutting the transparent substrate and the filtering thin films together to form a circular filter disk; and
   connecting the filter disk to a motor.

2. The method for fabricating a monolithic color wheel of claim 1, wherein the transparent substrate is square or nearly square shaped before the cutting step.

3. The method for fabricating a monolithic color wheel of claim 1, wherein the step of adding a plurality of color filtering thin films on the transparent substrate includes a deposition process.

4. The method for fabricating a monolithic color wheel of claim 3, wherein the step of preparing the transparent substrate includes a step of forming a mark, badge or pattern on the transparent substrate to form a reference point for cutting the transparent substrate.

5. The method for fabricating a monolithic color wheel of claim 1, wherein the step of preparing the transparent substrate includes a step of patching the plurality of color filtering thin films on the transparent substrate by adhesive.

6. The method for fabricating a monolithic color wheel of claim 5, wherein the step of preparing the transparent substrate includes a step of forming a mark, badge or pattern on the transparent substrate to form a reference point for cutting the transparent substrate.

7. The method for fabricating a monolithic color wheel of claim 1, wherein the step of connecting the filter disk to the motor includes bonding with an adhesive.

8. The method for fabricating a monolithic color wheel of claim 1, wherein the step of connecting the filter disk to the motor includes a step of connecting the filter disk to a metal ring which is connected to the motor, and is driven by the motor to rotate at high speed.

9. A monolithic color wheel, comprising:
   a motor having a shaft; and
   a filter disk having a single piece of substrate and a plurality of filtering films connected on the single piece of substrate, wherein said filter disk is connected to the motor shaft;
   wherein the filter disk is cut from the single piece of substrate and the plurality of color filtering thin films together along a circular path.

10. The monolithic color wheel of claim 9, wherein the filtering films include a plurality of color filtering thin films which are coated by a deposition process on the substrate.

11. The monolithic color wheel of claim 9, wherein filtering films include a plurality of color filtering thin films patched to the substrate by an optically transparent adhesive.

12. A monolithic color wheel, comprising:
   a motor having a shaft; and
   a metal ring connected to the motor shaft to be driven by the motor; and
   a filter disk connected to the metal ring, wherein the filter disk has a single piece of substrate and a plurality of color filtering thin films which are added on the single piece of substrate;
   wherein the filter disk is cut from the plurality of color filtering thin films and the single piece of substrate along a round path.

13. The monolithic color wheel of claim 12, wherein the filtering films include a plurality of color filtering thin films coated by a deposition process on the single piece of substrate.

14. The monolithic color wheel of claim 12, wherein filtering films include a plurality of color filtering thin films patched to the single piece of substrate by an optically transparent adhesive.

* * * * *